Oct. 3, 1933.　　　I. HECHENBLEIKNER　　　1,929,246
APPARATUS FOR THE TREATMENT OF GASEOUS PRODUCTS
Filed Dec. 31, 1930　　2 Sheets-Sheet 1

INVENTOR
Ingenuin Hechenbleikner
BY
　　Cavanagh & James
ATTORNEYS

Oct. 3, 1933.  I. HECHENBLEIKNER  1,929,246
APPARATUS FOR THE TREATMENT OF GASEOUS PRODUCTS
Filed Dec. 31, 1930    2 Sheets-Sheet 2

INVENTOR
Ingenuin Hechenbleikner
BY
Cavanagh & James
ATTORNEYS

Patented Oct. 3, 1933

1,929,246

UNITED STATES PATENT OFFICE

1,929,246

APPARATUS FOR THE TREATMENT OF GASEOUS PRODUCTS

Ingenuin Hechenbleikner, Charlotte, N. C., assignor to Chemical Construction Corporation, Charlotte, N. C., a corporation of Delaware Application December 31, 1930
Serial No. 505,775

3 Claims. (Cl. 183—50)

This invention relates to apparatus for the treatment of gaseous products such as gas filters and the like.

A filter for gaseous products may have the filtering material or medium distributed over a large area and having only a small thickness, or distributed over a small area and having a large thickness. In the former case, the gas to be filtered passes through the filter at a low velocity, whereas in the latter case it traverses the filter at a high velocity, and for these reasons it is found that substantially equal filtration may be obtained by either arrangement. The filter of large area requires less power for the propulsion of the gas therethrough, because of the thinness of the filtering medium and the low velocity of the gas. Also, the filter of large area need not be cleaned as often as the filter of small area, because if a portion of the area should clog, the gas continues to traverse the remainder of the effective filter area, with no substantial increase in impedance relative to that which would result in a filter having small area and large thickness, should the latter clog.

In spite of these recognized advantages of the filter of large area, such filters have heretofore not proved popular because of the large space requirements of the same, as well as the inconvenient structure which ordinarily is necessary to support the filtering medium and to increase and guide the gases to and from the same. The primary object of the present invention resides in the provision of a filter of large area which, however, will be embodied in a compact and convenient structure. With this object in view, the filter is made up of a large number of layers or filter sections which may be superposed for the sake of compactness, and the resulting apparatus is so arranged that these sections are effectively connected in parallel, rather than in series, so that the gas flows through all of the sections simultaneously, and any one particle of gas flows through only a single section of the filter. More specifically, the filter may comprise a stack of superposed plates with means spacing the same apart, and the filter material may be disposed in certain of the resulting spaces while the open spaces between the filled spaces may be used for the admission of gas to and discharge of gas from the filled or effective filter sections.

A further object of the present invention is to decrease the over-all height of the filter, and to this end the apparatus is preferably so arranged that each of the open spaces for the ingress of gas permits the gas to flow in opposite directions through the oppositely adjacent filter sections, while each of the open spaces for the egress of the filtered gas receives gas from the filter sections on either side of the said open spaces. With this arrangement all of the plates and sections of the filter stack may be made alike and interchangeable, and the over-all height of the filter stack is reduced to only two-thirds of the height needed if separate gas inlet and outlet spaces were provided for each filter section.

Still another object of the present invention is to improve the structure so far described by making the inlet and outlet areas of the open spaces between the filter sections a maximum for a given filter area, while necessitating a minimum increase in the over-all size of the filter structure. With this object in view, each of the superposed perforated plates of the stack are made annular in configuration and slightly smaller in diameter than a cylindrical casing in which the filter stack is mounted. The spacing means between the superposed plates comprise either complete rings or spaced lugs located at the inner and outer circumferences of the annular perforated plates, according as the flow of gas is to be prevented or permitted at the circumference in question, and these spaces are so selected as to permit gas flow between the annular space around the filter stack and alternate ones of the open spaces between the filter sections, and to further permit gas flow between the other or intermediate open spaces and the center or cylindrical space within the filter stack. Differently expressed, the spacing means comprise groups of three adjacent sealing rings separated by open spacer lugs which are located in unfilled spaces between the perforated plates, the spacer lugs at the outer circumference being in open spaces which are in staggered relation relative to those having spacer lugs at the inner circumference. On reflection it will be found that with this arrangement half of the height of the stack is effectively utilized for the filter sections, and all of the sections operate in parallel.

To the accomplishment of the foregoing and such other objects as will hereinafter appear, my invention consists in the filter elements and their relation one to the other, as hereinafter are more particularly described in the specification and sought to be defined in the claims. The specification is accompanied by drawings in which:

Figure 1:
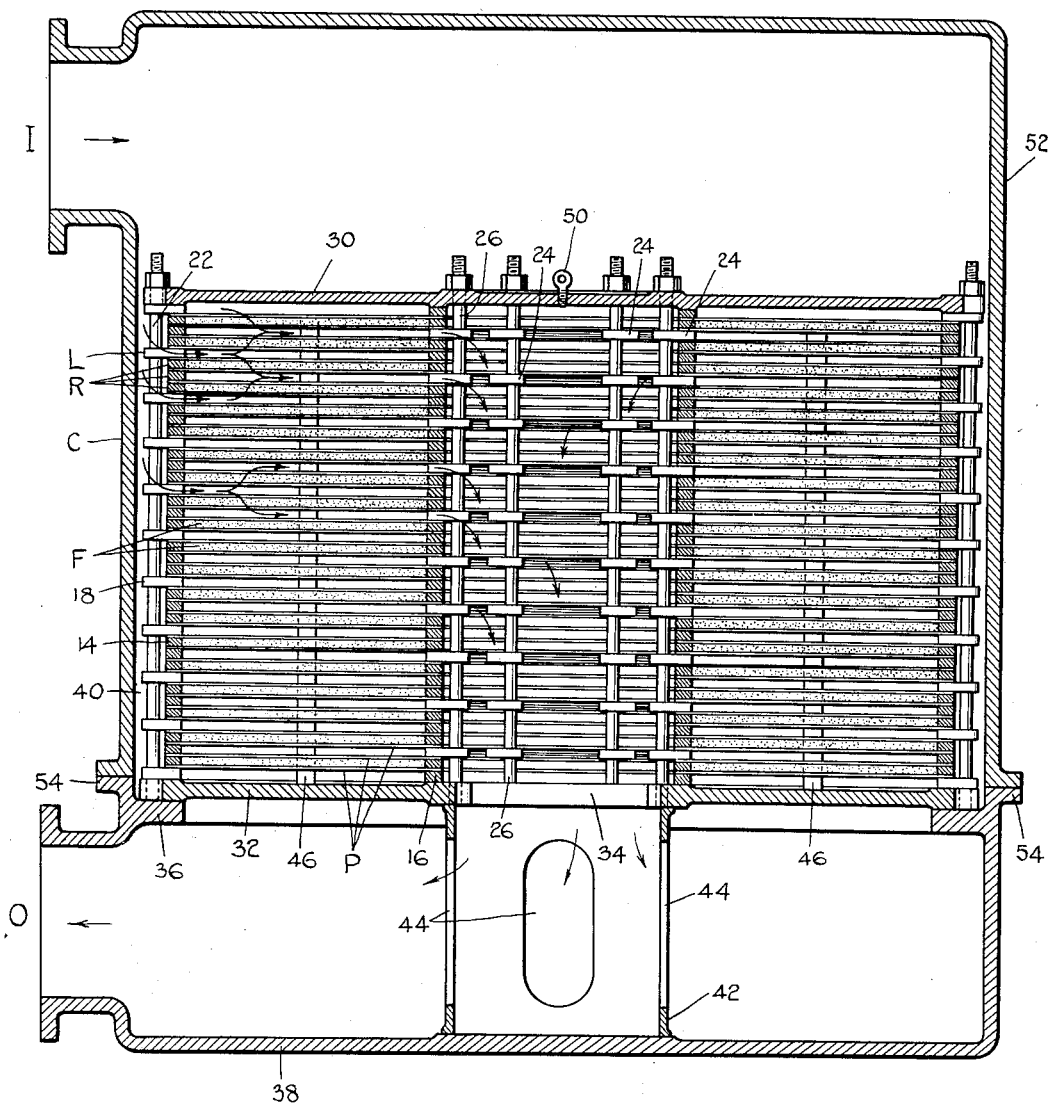
Fig. 1 is a section taken in elevation through a gas filter embodying my invention.

Referring to the drawings, the filter comprises a stack of superposed plates P, means L and R spacing the same apart, filter material F disposed in certain of the resulting spaces and preferably in alternate ones of the same, a casing C enclosing a filter stack, a gas inlet I, and a gas outlet O at the ends of the casing. The spacing means L and R are so designed as to admit gas from the gas inlet to certain of the open spaces between the filled spaces, and to discharge gas from the other of the open spaces to the gas outlet, so that the filter sections operate in parallel.

Considering the apparatus in greater detail, the plates P are preferably all alike and are provided with perforations 12 for the admission and discharge of gas. In preferred form, these plates are made annular in shape, and the outer diameter of the same is smaller than that of the casing C. The spacing means R comprise steel rings 14 at the outer circumference of the plates P, and are similar to, but larger than the steel rings 16 at the inner circumference of the plates. These rings are continuous and act as a sealing means.

The spacing means L are discontinuous and freely permit the flow of gas therethrough. As here constructed, these spacing means L consist simply of lugs 18 the outer ends of which are provided with a hole 20 slidably receiving the bolts or tie rods 22, and the inner ends of which are positioned between the perforated plates P for a distance about equal to the width of the rings R. The lugs 24 at the inner circumference of the plates may be made similar to the lugs 18 at the outer circumference of the plates, and are similarly mounted on bolts or tie rods 26 but project outwardly into the stack rather than inwardly, as is the case with the outside lugs 18.

The filter material F may be of any conventional type and preferably consists of finely divided quartz, because such a filter has no tendency to pack or clog. This filter material is placed between the superposed plates P in alternate spaces of the filter stack. The lugs L, of course, are in each case located in the open spaces between the resulting filled spaces. It should be noted, however, that these lugs, or open spacing means, are provided at only alternate ones of the open spaces, and that the lugs 18 at the outside of the stack are in open spaces which are in staggered or alternate relation with respect to the open spaces having the lugs 24 at the inside of the stack.

The casing C is preferably cylindrical, and is provided with gas inlet and gas outlet connections I and O. Means 30 is provided to prevent gas flow from the inlet connection I to the center of the stack, while permitting gas flow to the outside of the stack. Means 32 is provided to prevent gas flow from the outside of the stack to the gas outlet O, while permitting gas flow from the inside of the stack to the gas outlet. The means 32 preferably comprises a cast iron base plate having a large central aperture 34. The outer peripheral edge of the base plate 32 rests upon a flange 36 in the lower portion 38 of the casing, and thereby prevents gas flow from the annular space 40 around the filter stack to the gas outlet O. The weight of the stack may alone be used to provide the desired gas seal although, of course, appropriate packing such as asbestos may be interposed. The center of the base plate 32 may be supported by a section of cast iron pipe 42 placed between the bottom of the casing section 38 and the inner periphery of the base plate 32. This section of cast iron pipe should, of course, be largely cut away to form the openings 44 which permit the discharge of gas from the center of the stack through the pipe 42 and out of the outlet O.

Figure 2:
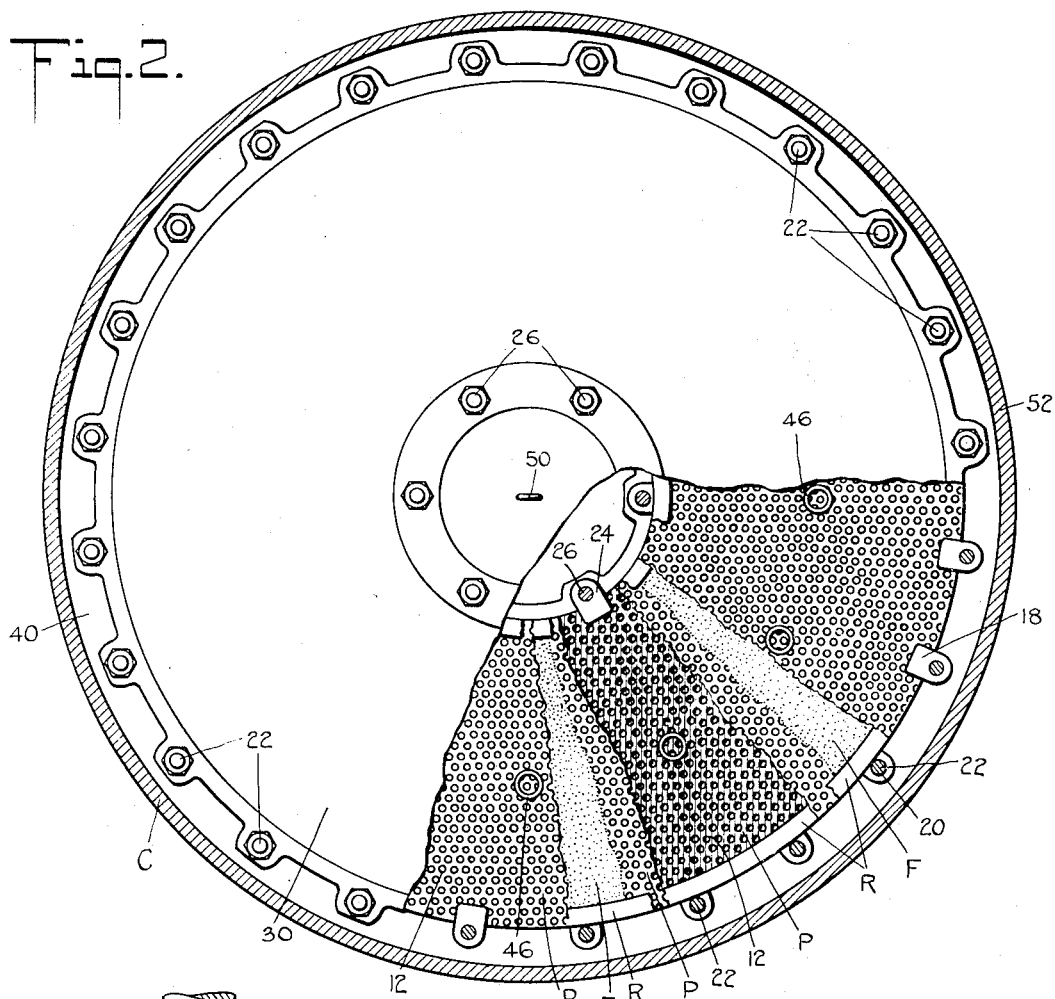
Fig. 2 is a horizontal section taken above the filter stack which is itself partially sectioned to illustrate the construction of the same.
Figure 3:
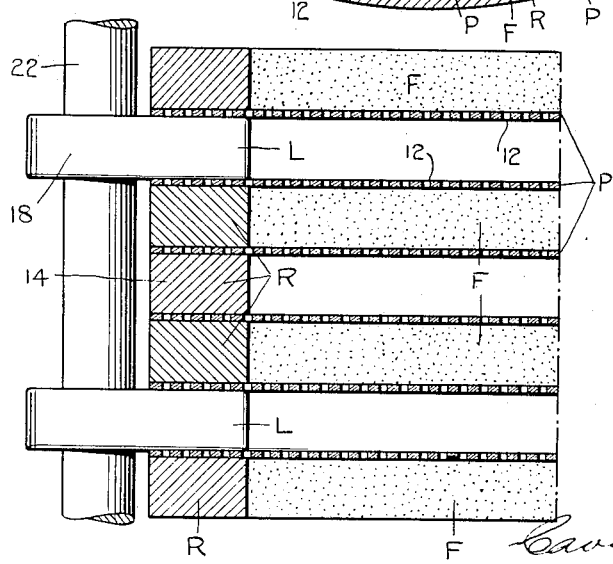
Fig. 3 is an enlarged detail section taken through one edge of a portion of the filter stack.

The base plate 32 has anchored therein the lower ends of the inside and outside bolts 22 and 26. These are preferably made of cold rolled steel. The filter stack is then assembled by superimposing the necessary annular plates P and spacing rings R in desired order. The filter material is distributed over the plates P within the inner and outer sealing rings, until the space is filled, at which time the next plate is added. At appropriate intervals the spacing lugs L are slid over the bolts 22 or 26 and used in place of the rings. To further support the plates P, pipe spacers 46 may be used. These consist simply of short lengths of pipe, the length of which is equal to the desired space between plates, and they may be distributed around the plates at a radius intermediate that of the inner and outer edges of the plates, as is clearly shown in Fig. 2.

When the top of the stack is reached, the plate 30 is added and bolted in place. This plate is preferably a cast iron cover plate which is imperforate except for the holes which receive the bolts 22 and 26. The eye bolt 50 shown in this plate is merely for convenience when lowering the plate on top of the stack. The plate prevents the flow of gas from the inlet I to the center of the stack; but is smaller in diameter than the casing, and, in fact, preferably conforms to the outline of the stack and therefore readily permits the flow of gas from the inlet I to the annular space 40 around the stack.

It will be understood that during the assembling of the stack in the manner heretofore described, the upper half 52 of the cast iron casing C is not in place. When the stack has been completely assembled, however, this upper half 52 of the casing may readily be lowered around the stack and onto the flange 54 on the lower half 38 of the casing to which it then may be bolted.

From an inspection of the drawings, and particularly Fig. 1 thereof, it will readily be appreciated that the gas is admitted to alternate ones of the open spaces between the filter sections, and that this gas flows freely because of the large circumferential area through which it may pass. The gas then divides and flows upwardly through the superjacent filter section and downwardly through the subjacent filter section. The gas which flows upwardly then combines with additional gas which flows downwardly from the next higher filter section, and the combined gas flows inwardly to the center or cylindrical space within the filter stack. The gas which flows downwardly through the subjacent filter section combines with gas which flows upwardly from the next lower filter section, and the combined gas passes inwardly to the center of the stack. All of the gas then flows downwardly through the center of the stack, and of course the cross section area of this passage is properly adjusted relative to that around the outside of the stack to obtain free passage of the gas. The gas then continues through the large opening 34 at the center of the base plate 32, through the cast iron pipe 42, and thence to the outlet O. In this way all of the filter sections operate in parallel, and the filter corresponds to one having an area equal to the sum of the areas of all of the filter sections, and having a thickness of only a single filter section. Any one particle of gas traverses only a single layer of the filtering medium. Only a small amount of power is therefore consumed in causing the gas to flow through the filter, for the resistance of the filter is low, and the gas velocity is likewise low. Effective filtering action, however, results in spite of the small thickness of the filtering bed, because of the low gas velocity.

The arrangement here shown, in which each of the open spaces between the filter sections deals with gas flowing in or received from opposite directions, is particularly valuable because it reduces the over-all height of the filter and makes the same compact not only laterally, due to the superposition of filter sections, but also in height, due to the large percentage of the total height which consists of effective filter sections. With the present arrangement half of the effective height is filled with filter material. If separate inlet and outlet spaces were employed for each filter section, only a third of the effective height could be utilized for filter material. Specifically, the present filter has twenty filter sections and is only forty-one spaces in height, instead of being sixty spaces in height as would be the case if an inlet and outlet space were employed for each of the twenty filter sections. Furthermore, this construction possesses the additional advantage that the superposed plates are all alike and are interchangeable. If separate inlet and outlet spaces were employed for each filter section, an imperforate partition or sealing plate would be needed between adjacent inlet and outlet spaces.

It should be understood that while I have designated the upper gas connection as an inlet and the lower gas connection as an outlet, the filter may equally well be employed with gas flowing in the opposite direction, the lower connection then being an inlet, and the upper connection then being an outlet. Of course the filter may instead be bodily inverted, in which case means corresponding to the pipe 42 would desirably be employed to support the plate 30, and other appropriate structural changes could readily be made. It should also be understood that it is not essential that the plates and filter sections be annular in configuration, for they might equally well be square or rectangular, with provision made for admitting gas at one side of the resulting stack, and discharging gas from the opposite side thereof. The annular shape here employed is advantageous because it permits of a cylindrical casing, and because it provides a maximum area for the free flow of gas into and out of the open spaces between the filter sections relative to the effective filtering area of the sections.

I may also point out that while the apparatus has so far been described as a gas filter, the structure disclosed may equally well be employed for the treatment of gaseous products, other than filtration. In such case it is merely necessary to substitute for the filter material F, other appropriate material, such as a catalyst, for the treatment of the gas, and, if necessary, to appropriately alter the thickness of the sections so as to obtain the desired duration of treatment of the gas.

The mode of constructing and using, and the many advantages of the present apparatus for the treatment of gaseous products, will, it is thought, be apparent from the foregoing detailed description thereof. It will be apparent that while I have shown and described my invention in the preferred form, many changes and modifications may be made in the structure disclosed without departing from the spirit of the invention, defined in the following claims.

I claim:

1. A gas filter comprising an upright cylindrical casing, a stack of superposed annular perforated plates smaller in diameter than the casing, means spacing the same apart, filter material disposed in alternate ones of the resulting spaces, a plate at one end of said stack and having a large central opening, the periphery of said plate being attached to said casing, an imperforate plate closing the other end of the resulting stack of filter sections, the periphery of said cover plate also being spaced from the wall of the cylindrical casing, gas inlet and outlet connections at opposite ends of said casing, the aforesaid spacer means being located at the inner and outer circumference of the annular perforated plates, said spacer means comprising complete rings and spaced lugs, the complete ring being used where the flow of gas is to be prevented, and the spaced lugs being used where the flow of gas is to be permitted at the circumference in question, the latter being so selected as to permit gas flow between one of said connections through the annular space between the filter stack and the casing and alternate ones of the open spaces between the filled spaces, and to permit gas flow between the intermediate open spaces through the cylindrical space within the filter stack and the other of the connections.

2. A structure for the treatment of gas comprising an upright cylindrical casing, a base plate having a large central opening, the periphery of said base plate being attached to said casing, a stack of superposed annular perforated plates smaller in diameter than the casing, means spacing the same apart, material for treating the gas disposed in alternate ones of the resulting spaces, an imperforate cover plate mounted on top of the resulting stack of sections, the periphery of said cover plate also being spaced from the wall of the cylindrical casing, a gas inlet at the top of said casing above said cover plate, a gas outlet at the bottom of said casing below said base plate; the aforesaid spacer means being located at the inner and outer circumference of the annular perforated plates, said spacer means comprising complete rings and spaced lugs, the complete rings being used where the flow of gas is to be prevented, and the spaced lugs being used where the flow of gas is to be permitted at the circumference in question, the latter being so selected as to admit gas from the gas inlet around the annular space between the stack and the casing into alternate ones of the open spaces between the filled spaces, and to discharge gas from the intermediate open spaces into the cylindrical space within the stack and downwardly through the central aperture in the base plate to the gas outlet.

3. A gas filter comprising an upright cylindrical casing, a base plate having a large central opening, the periphery of said base plate being attached to said casing, a stack of superposed annular perforated plates smaller in diameter than the casing, means spacing the same apart, filter material disposed in alternate ones of the resulting spaces, an imperforate cover plate mounted on top of the resulting stack of filter sections, the periphery of said cover plate also being spaced from the wall of the cylindrical casing, a gas inlet at the top of said casing above said cover plate, a gas outlet at the bottom of said casing below said base plate, the aforesaid spacer means being located at the inner and outer circumference of the annular perforated plates, said spacer means comprising complete rings and spaced lugs, according as the flow of gas is to be prevented, and the spaced lugs being used where the flow of gas is to be permitted at the circumference in question, the latter being so selected as to admit gas from the gas inlet around the annular space between the filter stack and the casing into alternate ones of the open spaces between the filled spaces, and to discharge gas from the intermediate open spaces into the cylindrical space within the filter sections and downwardly through the central aperture in the base plate to the gas outlet.

INGENUIN HECHENBLEIKNER.